United States Patent Office

3,794,503
Patented Feb. 26, 1974

3,794,503
HOLLOW SPHERES CONSISTING OF ALKALI METAL SILICATE AND A POLYSALT
David I. Netting, Springfield, Pa., assignor to Philadelphia Quartz Company, Philadelphia, Pa.
No Drawing. Filed May 12, 1972, Ser. No. 252,763
Int. Cl. C08h 17/02
U.S. Cl. 106—288 B
11 Claims

ABSTRACT OF THE DISCLOSURE

The invention relates to a process for the manufacture of an economical filler of low bulk density that is especially useful for incorporation in unsaturated polyester systems and which does not react with the components of the unsaturated polyester system. Solutions of sodium silicate and inorganic polysalts are mixed, spray dried, and the product from the spray drier is then further dried to a water content below about 7%.

BACKGROUND

Prior art workers have devised a number of different ways of producing fillers that consist of a mass of small hollow spheres. Such products have been produced from both organic and inorganic chemicals (as well as mixtures thereof) and vary in density, size, strength, chemical characteristics and utility. Although the primary use for such spheres has been a fillers, they also have a number of other uses, such as an insulation material. Some of these prior art processes utilize spray drying techniques.

THE PRESENT INVENTION

The present invention is directed to an inexpensive method for producing small increments or particles of inorganic materials that are essentially in the form of hollow spheres and that are especially useful as fillers in plastic compositions. Considered from one aspect, the method of the present invention can be exemplified by the following sequence of steps (which may be considered in conjunction with the attached flow sheet). (The percentages are by weight unless otherwise specified.)

(a) providing a first aqueous solution consisting essentially of sodium silicate that is characterized by a $SiO_2:Na_2O$ mol ratio of between about 1.5:1 and 4.0:1; and a $Na_2O$ content of 5 to 20%;

(b) providing a second aqueous solution consisting essentially of inorganic polysalt having a concentration within the range of about 5–50%;

(c) bringing said first and second solutions set forth in (a) and (b) together in a first chamber in such a way that said second solution is brought into intimate admixture with said first solution with such speed and efficiency that the formation of localized pockets of irreversible gel is substantially avoided;

(d) withdrawing a liquid stream from said first chamber before the contents of said first chamber, at a solids content of about 5 to about 50%, have had a chance to form any substantial amounts of an irreversible gel, the temperature of said withdrawn liquid stream being

---

AQUEOUS SODIUM SILICATE →
SUCH AS: "D" SODIUM SILICATE or "RU" SODIUM SILICATE
PROPERTIES:
  $SiO_2:Na_2O$ ratio of 1.5 to 4.0
  preferably ratio of 1.8 to 2.8
  most preferably ratio of 2.0 to 2.4
  $Na_2O$ content of from about 5–20%
TEMPERATURE: from room temperature to slightly below the boiling point of the solution

FIRST CHAMBER with vigorous agitation ← AQUEOUS SOLUTION OF AMMONIUM PENTABORATE (APB)
TEMPERATURE: from room temperature to slightly below the boiling point of the solution
CONCENTRATION: 5–30% (higher concentrations favor the formation of irreversible gel)

HOMOGENEOUS SOLUTION
VISCOSITY: BETWEEN ABOUT 0.1 and 200 CENTIPOISES SOLID CONCENTRATION: 5–35%
TEMPERATURE: from room temperature to slightly below the boiling point of the APB solution
APB CONCENTRATION: 3–15%
SOLIDS RATIO OF APB TO SILICATE: between about 0.03:1 and 0.5:1 and preferably 0.06:1 to 0.5:1

SPRAY DRYER ← INLET AIR TO SPRAY DRYER 200–500° C.
→ OUTLET AIR FROM SPRAY DRYER 100–300° C.

SPRAY DRIED PRODUCT
WATER CONTENT: PREFERABLY LESS THAN 25%
PARTICLE SIZE: 100–400 mesh
BULK DENSITY: 2–20 LBS./ft.³

DRYER -------- PREFERABLY A TWO-STAGE DRYER COMPRISING:
  (1) a low temperature section at 70–200° C. and
  (2) a high temperature section at 200–400° C.

MASS OF SMALL HOLLOW SPHERICAL LOW-DENSITY PARTICLES
BULK DENSITY: 2–20 lbs./ft.³
WATER CONTENT: below 7% and preferably below 4%
SIZE: 10–400 mesh
PRIMARY USE: FILLER FOR RESIN SYSTEMS
PROPERTIES: non-reactive with alkali-reactive polymers and/or additives; closed cells; low oil absorption; smooth regular spheres between about room temperature and a temperature slightly below the boiling point of the liquid stream;

(e) spray drying the liquid stream set forth in (d) and recovering a spray dried product, that consists essentially of a mass of small hollow spheres;

(f) subjecting the spray dried product of (e) to further drying at a temperature within the range of 70° C.–400° C. for a time sufficient to reduce the moisture content below about 7%; and (g) recovering a mass of generally hollow spherical particles having a bulk density of about 2–20 lbs./ft.$^3$; a particle size within the range of 10–400 mesh; and a water content of 0–7%.

While the $SiO_2$:$Na_2O$ range set forth in step (a) is quite satisfactory, I prefer to work within a $SiO_2$:$Na_2O$ ratio range of 1.8 to 2.8, and the range of 2.0 to 2.4 is especially preferred. The viscosity of the sodium silicate is not critical, the main requirement being that it not be so thick that it is difficult to mix with the polysalt. The temperature of the aqueous sodium silicate may be at any temperature between room temperature and a little below the boiling point of the solution.

I find that salts which hydrolize to form alkali metal salts of lower ratio of anion to cation are useful in this process. These salts are usually colloidal inorganic polysalts of alkali metals and/or ammonium cations. Sodium silicate in solution is likewise hydrolized and the end result of the interaction is that a silicate of apparently higher $SiO_2$:$Na_2O$ ratio is formed in the final product and thus the alkali is less active, that is the pH is reduced. I prefer to use polyborates and polyphosphates as these are readily available in either or both soluble glass, and crystalline forms. The ammonium polysalts have the advantage that ammonia is driven off by heating and thus the ratio of anion oxide to alkali metal oxide is increased in the final product at the same time producing a more insoluble product. Both effects are useful when this product is employed as a filler for unsaturated polyester resins.

The amount of polysalt which may be used will vary with the characteristics of the polysalt and its relation to the alkali metal silicate solution. The ratio of polysalt solids to silicate solids ranges from about 0.02:1 to about 3. A homogenous ammonium pentaborate solution with sodium silicate may have from 5 to 35% solids with 3 to 15% of ammonium polyborate and 0.03:1 to 0.5:1 solids ratio of polyborate to the silicate solids and preferably 0.06:1 to 0.5:1. Sodium pentaborate on the other hand is only effective in the homogeneous solution in the range of 17.5 to 35% solids with 6 to 7% of sodium pentaborate and 0.02:1 to 0.3:1 ratio of sodium pentaborate solids to silicate solids. Glassy sodium metaphosphate is miscible in all proportions with solutions of sodium silicate but is only effective at about 30 to 50% solids content with 20% or more sodium metaphosphate present at a ratio of about 1:1 to 3:1 metaphosphate solids to silicate solids.

The concentration of the aqueous ammonium pentaborate solution should usually be within the range of from about 5% to about 30% by weight. If higher concentrations are used it is difficult to mix with the silicate solution without irreversible gel formation. Solutions of ammonium pentaborate are sufficiently reactive with the alkali of the soluble silicate to prevent discoloration of alkali sensitive polyester resin compositions, and simple to prepare. The temperature of the aqueous ammonium pentaborate solution may be any temperature between room temperature and a little below the boiling point of the solution. Ammonium pentaborate (APB) has the formula $(NH_4)_2 \cdot O \cdot 5B_2O_3 \cdot 8H_2O$ and consists of 9.6% $(NH_4)_2O$; 63.9% $B_2O_3$; and 25.6% $H_2O$.

The concentration of the aqueous sodium pentaborate solution should usually be within the range of from about 16% to about 18% by weight. If higher concentration are used it is difficult to mix with the silicate solution without irreversible gel formation. Solutions of sodium pentaborate are sufficiently reactive with the alkali to prevent much discoloration of polyester resin compositions, and simple to prepare. The temperature of the aqueous sodium pentaborate solution may be any temperature between room temperature and a little below the boiling point of the solution. Sodium pentaborate (SPB) has the formula $Na_2O \cdot 5B_2O_3 \cdot 10H_2O$ and consists of 10.5% $Na_2O$; 59% $B_2O_3$; and 30.5% $H_2O$.

The polysalt and sodium silicate may be brought together in any of several ways and the concentration of solids in the final homogeneous solution should preferably be within the range of about 5–50%. In my work I have found it preferable to add the polysalt solution to a tank containing the silicate solution. The temperature should be between about room temperature and below the boiling point of the homogeneous solution. In order to minimize or avoid irreversible gelation, the sodium silicate at the higher ratios of $SiO_2$:$Na_2O$ will require more dilution and lower concentrations of the polysalt. I may add ammonium pentaborate as a hot 5–35% solution but I prefer to add warm ammonium pentaborate as a 10% solution to a sodium silicate solution and with sufficient agitation so as to avoid the formation of irreversible gel. The homogeneous solution preferably contains between about 3 and 15% of the pentaborate.

I may add warm sodium pentaborate as a 16–18% solution to a warm or hot sodium silicate solution such as "D" sodium silicate and with sufficient agitation so as to avoid the formation of irreversible gel. Rather vigorous agitation is essential for the reason that if a high concentration of pentaborate salt is allowed to build up at any point, a gel will begin to precipitate. This should be avoided as much as possible. It is permissible to have very small particles of gel dispersed throughout the mixture so long as the gel particles do not form big enough lumps to condense and become non-dispersible (i.e. irreversible). (A "lump" is intended to mean a visible concentration of solid.)

The liquid stream withdrawn from the aforesaid first chamber in step (d) preferably has a viscosity within the range of from about 0.1 to about 200 cp.

Any of the available commercial spray drying systems may be used. The specific conditions of spray drying will of course vary with the particular spray dryer that is employed. Generally spray drying should be carried at a temperature below the boiling point of the sprayed particles, i.e. to avoid intumescence. Nevertheless I can say generally that I prefer air inlet temperature from about 200 to 500° C. and air outlet temperatures ranging from about 100 to about 300° C. It is important in setting the inlet temperature to avoid boiling the droplets as they enter the spray dryer. However, the temperature should be high enough to obtain at least a limited expansion of the droplets in the spray drying zone. For our most preferred product for instance, we have found it best to use a spray tower with a wheel atomizer and short residence time.

The solid products removed from the spray dryer must have less than about 25% and preferably less than about 20% water in order to avoid aggregation or sticking of one particle to another.

Fine control of the product properties is obtained by careful adjustment of inlet and outlet temperatures. For instance in a given drier, an inlet temperature of 550° F. gave higher production rates but the sphericity of the product and therefore its efficiency as a filler was better at 450° F. The outlet temperature may also be adjusted to make small changes in bulk density. Other conditions such as the wheel speed or nozzle pressure may determine whether there is build-up on the walls, agglomeration of the product, or early collapse of the spheres.

Particles from the dryer have been heated sufficiently to form a product within the size range of 10 to 400 mesh and have a water content of from about 10 to 25% $H_2O$ and a bulk density of from 2 to 20 lbs./ft.$^3$. The shells are completely amorphous. The gas enclosed in the cells is essentially air and is substantially free of any ammonia even when ammonium polyborate is used, the cells having been expanded by steam. The following table gives a typical analysis of the air content in the initial cells as produced by the spray dryer and the cells which have been further dried. The composition is compared with analysis of air itself.

| Component | Air | Initial cells | Dry cells |
|---|---|---|---|
| Nitrogen | 78 | 73 | 77.8 |
| Oxygen | 20.8 | 19.5 | 20.9 |
| Argon | 0.8 | 0.7 | 0.8 |
| Carbon dioxide | 0.2 | 0.05 | |
| Hydrogen | 0.4 | 0.3 | 0.4 |
| Water | | 6.3 | 0.05 |
| Total | 100.0 | 100.0 | 100.0 |

Typically, spheres produced with ammonium pentaborate and sodium pentaborate have approximately the following compositions:

| Components | APB (percent) | | SPB (percent) | |
|---|---|---|---|---|
| | Initial | Dry | Initial | Dry |
| SiO$_2$ | 50.8 | 56 | 45.3 | 50.6 |
| Na$_2$O | 25.4 | 28 | 25.3 | 28.4 |
| B$_2$O$_3$ | 11.6 | 12.7 | 14.7 | 16.6 |
| H$_2$O | 12.2 | 3.3 | 14.7 | 4.4 |
| Total | 100.0 | 100.0 | 100.0 | 100.0 |

The final dried cell product will have a size range from about 10 to 400 mesh with a water content of between 0 and 7% and preferably less than 4%. The bulk density, true particle density and the ratio of anion oxide to alkali metal oxide will be the same as in the initial or original wet product. This product when used at the rate of 10 parts by weight to 100 parts by weight of polyester monomer does not affect the setting time or color.

More than 95% of these particles, either wet or dry, will float on a non-aqueous liquid having a density greater than that of the particles themselves. A better criterion of complete spherical, non-porous character is found by checking the density of the filled unsaturated polyester resin. If any substantial numbers of spheres are broken or open, the resin will tend to penetrate the spheres and the overall density of the resin will increase from the initial density to the final density after set. If the spheres are substantially unbroken or non-porous, the increase in density after 48 hours will be no more than about 10% and may be no more than about 2 to 5%.

A typical product of the best conditions of operation will have the following properties:

| | | |
|---|---|---|
| Bulk density | lbs./ft.$^3$ | 3–7 |
| True particle density | lbs./ft.$^3$ | 15–25 |
| Ignited loss | percent | 3–6 |
| Weight fraction to give 1500 cp. | do | 6–9 |
| Volume fraction to give 1500 cp. | do | 30–35 |
| Immediate casting density | lbs./ft.$^3$ | 53–56 |
| Density change on setting | lbs./ft.$^3$ | 2–4 |
| Particle size range: | | |
| +80 M | percent | 4–6 |
| 80–100 M | do | 13–20 |
| 100–325 | do | 60–75 |
| −325 | do | 8–12 |
| Moisture absorption (24 hrs.) | do | 3 |
| Oil absorption [1] | do | 100 |
| pH (10% slurry) | | 10.7 |

[1] 100 lbs. of oil to 100 lbs. of filler.

The final drying step (f) is carried out slowly to reduce the total moisture of the spray dried product to below about 7% and I prefer a moisture below about 4%. The final drying step does not change the bulk density or true particle density significantly because whereas there is a loss of weight as the water is removed there is also a slight shrinkage of the particles. Any convenient drying means is acceptable. It is only necessary to avoid significant intumescence.

If it is necessary to cool the spheres between the spray drying and final drying procedures, it is necessary to bring the spheres up again to the drying temperature slowly so as to avoid a great difference between the external and internal pressures.

A preferred apparatus for carrying out the final drying step is a rotary dryer having a low temperature section (e.g. 70°–200° C. and most preferably about 150° C.) and a high temperature section (e.g. 200°–400° C. and most preferably about 300° C.) and wherein air is passed through the dryer concurrently or countercurrently with the material to be dried. The purpose is to reduce the water content below the amount which will react to discolor a polyester resin composition and to avoid further expansion of the particles.

The typical polyester resin compositions in which my product is particularly effective are those with unsaturated polyester resins which are polycondensation products of mainly unsaturated dicarboxylic acids and dihydroxy alcohols cross-linked with unsaturated monomers. The acids are usually maleic or fumaric and the crosslinkers are usually styrene or diallyl phthalate. They are polymerized ordinarily with either benzoyl peroxide or methyl ethyl ketone peroxide and a cobalt salt accelerator.

EXAMPLES

The following examples are illustrative of some preferred embodiments of the present invention. It should be understood that these examples are not intended to limit the invention and that obvious changes may be made by those skilled in the art without changing the essential characteristics and the basic concept of the invention. The parts and percentages are by weight, the temperature is room temperature, and the pressure is atmospheric, unless otherwise indicated.

The spray dryer employed in Examples 1–4 was a Nerco-Niro portable spray dryer of the centrifugal atomizer type.

Several commercial silicates such as "D" and "RU" have been used in the examples. These silicates are both made by the Philadelphia Quartz Company of Philadelphia, Pa., and this company is the owner of the trademarks "D" and "RU." The properties of "D" sodium silicate are: a SiO$_2$/Na$_2$O ratio of 2.0, a Na$_2$O content of 14.7%, a water content of 55.9% and a viscosity of 400 cp. The properties of "RU" sodium silicate are: a SiO$_2$/Na$_2$O ratio of 2.4, a Na$_2$O content of 13.9%, a water content of 52.9% and a viscosity of about 2100 cp.

Example 1

500 parts by weight of "D" sodium silicate at room temperature were slowly and thoroughly mixed with a warm aqueous solution containing 450 parts by weight of water and 50 parts by weight of ammonium pentaborate in a tank. The water used to dissolve the pentaborate was first heated to above about 60° C. The two were agitated together until all lumps were dispersed and dissolved, i.e. about 5 to 10 minutes. There was a strong odor of ammonia released as the reaction proceeded.

The resulting homogeneous solution with a viscosity below about 200 cp. was removed from said tank and fed to a spray dryer. The inlet temperature of the air entering the spray dryer was between about 390° and 420° C. and the outlet temperature of the air leaving the spray dryer was between about 140–160° C. The atomization pressure was 6 kg./cm.² The product from the spray dryer had the following analysis:

$SiO_2$ _____ 50.8%.
$Na_2O$ _____ 25.4%.
$B_2O_3$ _____ 11.6%.
$H_2O$ _____ 12.2%.
Average particle size _____ Minus 50 to plus 200 mesh.
True particle density _____ 28 lbs./ft.³.
Bulk density _____ 12 lbs./ft.³.
($B_2O_3+SiO_2$) (anion oxide)/$Na_2O$ mol ratio ____ 2.46.

The solid product recovered from the spray dryer was then dried in an oven in which the initial temperature was below about 100° C. and gradually the temperature was raised to about 300° C. over about one hour.

The product taken from the oven had the following properties:

$SiO_2$ _____ 56%.
$Na_2O$ _____ 28%.
$B_2O_3$ _____ 12.7%.
$H_2O$ _____ 3.3%.
($B_2O_3+SiO_2$):$Na_2O$ _____ 2.46.
Bulk density _____ 12 lbs./ft.³.
Average particle size _____ Minus 50 to plus 200 mesh.

When the same experiment was carried out except that the spray drying was carried out at an atomization pressure of 2 kg./cm.², the bulk density was 5.3 lbs./ft.³ and the true particle density was 25 lbs./ft.³. Thus, in general, lower atomization pressures will result in a lower bulk density. Less than 5% of this product failed to float on toluene for 24 hours.

Ten parts of product from the oven (having a bulk density of 12 lbs./ft.³) were mixed with 100 parts by weight of a typical polyester resin [Polylite 32–353 from Reichold Chemical Company]. The resin color was unaffected. The casting density was 57 lbs./ft.³ and changed little in 48 hours showing that the filler was essentially free of holes. The color of the casting was white when fresh and was grey after 24 hours.

Example 2

In another experiment, which was like Example 1 except that 600 parts by weight of the ammonium pentaborate solution was mixed with the 500 p.b.w. of "D" silicate; and the liquid material withdrawn from the tank was spray dried at an atomization pressure of 2 kg./cm.². The bulk density of the product from the spray dryer was 5 lbs./ft.³ and the true particle density was 22 lbs./ft.³. The mol ratio of ($B_2O_3+SiO_2$)/$Na_2O$ was 2.5. After final drying at 300° C., the resulting filler material was mixed with a polyester resin as in Example 1 and was found to have a high viscosity, i.e. about 2500 cp. The initial casting density was 45 lbs./ft.³ and changed little in 24 hours. The color was white even after 24 hours. This shows that with sufficient ammonium pentaborate the alkali and water do not react with the polyester composition. More than 95% of the filler remained floating on toluene for over 24 hours.

Example 3

With the same mixtures as in Example 2 spray dried at 6 kg./cm.², the bulk density was 9.2 lbs./ft.³ and a true particle density of 29 lbs./ft.³. After drying finally at 300° C., the resulting material was mixed with a polyester composition as in Example 1 and was found to have a low viscosity, i.e. about 1,000 cp. The casting density was 63 lbs./ft.³ and after 24 hours the density was 65 lbs./ft.³ and the product was still white.

Casting density depends on the particle size as well as the density of the filler. A filler made in about the same way as in Example 3, which had a bulk density of 8.2 had the following particle size distribution and gave the following casting densities when used at 10 grams of filler per 100 grams of the resin of Example 1.

|  | Lbs./ft.³ |
|---|---|
| −48 +100 H | 59.5 |
| −100 +150 | 46.2 |
| −150 +200 | 46.9 |
| −200 +270 | 59.3 |
| −270 +325 | 59.3 |
| −325 | 66.3 |

Example 4

Some experiments were carried out with varying weight ratios of ammonium pentaborate to sodium silicate (i.e. a varying APB/$Na_2O$ ratio). The results of these experiments are set forth in Table I below.

TABLE I

| Parts by weight of— | | | Ratio of APB/$Na_2O$ | Extent of reaction of resulting mixtures with polyester resin |
|---|---|---|---|---|
| Sodium silicate | APB | $H_2O$ | | |
| "D" | | | | |
| 100 | 8 | 72 | 0.54 | Moderate. |
| 100 | 10 | 90 | 0.68 | Slight. |
| 100 | 12 | 108 | 0.81 | Very slight. |
| 100 | 14 | 126 | 0.95 | Gelled the silicate. |
| "RU" | | | | |
| 100 | 6 | 54 | 0.43 | Moderate. |
| 100 | 8 | 72 | 0.57 | Slight. |
| 100 | 10 | 90 | 0.72 | Very slight. |
| 100 | 12 | 108 | 0.87 | Do. |
| 100 | 13 | 117 | 0.95 | Gelled the silicate |

These experiments show that at this concentration when the APB/$Na_2O$ weight ratio is below about 0.55 (.15 APB/silicate solids) there will be a moderate reaction with polyester resin and at a ratio above about 0.90 (0.2 APB/silicate solids) the incidence of gel formation increases and prevents satisfactory particle formation. At greater dilutions, the ratio may be increased above 0.90.

The following Table II shows the relationship between the water content of my final product prepared as in Example 1 and the degree to which that product will react with a polyester resin.

TABLE II

| Ignition loss, percent: | Reaction with resin |
|---|---|
| 10 | High. |
| 7.5 | High. |
| 5.8 | Moderate. |
| 4.7 | Slight. |
| 3.4 | Very slight. |
| 2.2 | No reaction. |

It is thus seen that I prefer my final product to have a water content below about 7% and preferably below 4%.

I also conducted some experiments to show the influence of the concentration of the fluid fed to the spray dryer upon the spray dryer itself. Pertinent data relative to these experiments are set forth in Table III:

TABLE III

| Parts by weight of— | | | Appearance of product | Atomization wheel conditions |
|---|---|---|---|---|
| "D" | APB | Water | | |
| 100 | 10 | 120 | Normal | Clean. |
| 100 | 10 | 100 | do | Do. |
| 100 | 10 | 90 | do | Do. |
| 100 | 10 | 80 | do | Do. |
| 100 | 10 | 70 | do | Some filamentation. |
| 100 | 10 | 60 | do | More filamentation. |
| 100 | 10 | 50 | do | Bad filamentation. |

Example 5

A mixture comprising 50% "D" sodium silicate, 5% ammonium pentaborate and 45% water (with an overall solids content of 25%) was fed to a centrifugal spray dryer having a 7 ft. diameter and a stainless steel 70° conical bottom with a single bottom outlet, 3,500 c.f.m. air flow and cyclone collection (as sold by the Bowen Engineering Co.). This feed material, having a viscosity of below 100 cp. was fed to the atomizer at room temperature at an average feed rate of 7.7 lbs. per minute, with a dryer air inlet temperature of 500° F. (260° C.) and an air outlet temperature of 325° F. (163° C.) using direct gas heat. The centrifugal atomizer had a 5 inch vane and the atomizing force was 21,000 r.p.m. The product recovered had a bulk density of 5 lbs./ft.$^3$ and an ignition loss of 13.6%. The true particle density by pycnometer was 29 lbs./ft.$^3$. The mol ratio of

was 2.45.

This spray dried product was then further dried by heating a layer of about one inch thickness at 100° C. for one hour in an oven, whereafter the temperature was raised to 225° C. for one hour, and finally to 300° C. for one hour. The thus dried product had a bulk density of 3.4 lbs./ft.$^3$, a true particle density of 29 lbs./ft.$^3$, an ignition loss of 3.5% and the following Tyler screen analysis:

|  | Percent |
|---|---|
| +50 M | 0.3 |
| −50 to +80 M | 5.2 |
| −80 to +100 M | 12.4 |
| −100 to +140 M | 22.1 |
| −140 to +325 M | 49.3 |
| −325 M | 10.7 |

More than 95% remained floating on toluene for 24 hours.

A typical polyester resin, Marco #GR 17041 (distributed by W. R. Grace Co.) when filled at 8% filler loading with this product had a cast density of 54.6 lbs./ft.$^2$ and at 10% filler loading 52.7 lbs./ft.$^3$ after 24 hours, the density had increased less than 10%. The viscosity before casting was 1200 cp. at 8% and 2700 cp. at 10%.

Example 6

500 parts by weight of "D" sodium silicate at room temperature were slowly and thoroughly mixed with a warm aqueous solution containing 450 parts by weight of water and 90 parts by weight of sodium pentaborate (SPB) in a tank. The water used to dissolve the pentaborate was first heated to above about 60° C. This composition had a SPB $Na_2O$ ratio of 1.22. The two were agitated together until all lumps were dispersed and dissolved, i.e. about 5 to 10 minutes.

The resulting homogeneous solution with a viscosity below about 200 cp. was removed from said tank and fed to a spray dryer. The inlet temperature of the air entering the spray dryer was between about 390° and 420° C. and the outlet temperature of the air leaving the spray dryer was between about 140–160° C. The atomization pressure was 3 kg./cm.$^2$. The product from the spray dryer had the following analysis:

| | |
|---|---|
| $SiO_2$ | 45.3%. |
| $Na_2O$ | 25.3% |
| $B_2O_3$ | 14.7%. |
| $H_2O$ | 14.7%. |
| Anion oxide/$Na_2O$ mole ratio | 2.33%. |
| Average particle size | Minus 50 to plus 200 mesh. |
| Bulk density | 5.4 lbs./ft.$^3$. |
| True particle density | 22.2 lbs./ft.$^3$. |

The solid product recovered from the spray dryer was then dried in an oven in which the initial temperature was below about 100° C. and gradually the temperature was raised to about 300° C. over about one hour.

The product taken from the oven had the following properties:

| | | |
|---|---|---|
| $SiO_2$ | percent | 50.6 |
| $Na_2O$ | do | 28.4 |
| $B_2O_3$ | do | 16.6 |
| $H_2O$ | do | 4.4 |
| True particle density | lbs./ft.$^3$ | 23 |
| Bulk density | lbs./ft.$^3$ | 5.5 |

Over 95% remained floating on toluene for 24 hours. average particle size—minus 50 to plus 200 mesh.

Nine parts of product from the oven were mixed with 100 parts by weight of a typical polyester resin [Polylite 32–353 from Reichold Chemical Company]. The Krebs viscosity was 400 g. and the Brookfield viscosity was 1790 cp. The resin color developed only a light color change (light purple). The casting density was 54 lbs./ft.$^3$ and increased only to 58 lbs./ft.$^3$ in 24 hours showing that the filler was essentially free of holes. The color of the casting was white when fresh and was grey after 24 hours.

When only 75 p.b.w. of SPB was used forming a composition with a SPB/$Na_2O$ ratio of 1.02, the final product had a high reaction with the typical unsaturated polyester resin composition used; that is the resin composition quickly turned purple. When 100 p.b.w. of SPB was used forming a composition with an SPB/$Na_2O$ ratio of 1.36, the mixture gelled before it could be spray dried. With more dilute solutions of "D" sodium silicate or with other sodium silicate solutions somewhat different SPB/$Na_2O$ ratios would be found effective, but the same principle applies.

Example 7

In this example 200 parts by weight of "D" sodium silicate were diluted with 200 parts by weight of water and 100 parts by weight of sodium hexametaphosphate (a polyphosphate) was dissolved in the diluted silicate. The anion oxide to cation ratio was 1.40. The homogeneous solution was spray dried using the Nerco-Niro spray dryer described in Example 1 at an atomization pressure of 2.5 kg. The air temperature at the inlet was 415° C. and at the outlet the temperature was 150° C. The product was further dried as in Example 1 and was then found to have an ignition loss of 1.5% and a bulk density of 4.7 lbs./ft.$^3$. Over 95% floated on toluene for 24 hours. The product was tested in polyester resin as in Example 1 and was found to have only a moderate reaction. Since there is no solubility limit in mixing this colloidal polyphosphate with sodium silicate, such a system with more than about 20% polyphosphate will show little or no reaction with the resin and, if an ammonium polyphosphate is substituted, there will be no reaction visible.

Example 8

Using the conditions described in Example 7, I spray dried a homogeneous solution of 100 parts by weight of sodium silicate having an $SiO_2$:$Na_2O$ ratio of 3.22 and 8.9% $Na_2O$, 200 p.b.w. of water and 103 p.b.w. (25.5%) of sodium hexametaphosphate (1.1 $Na_2O$:1.0 $P_2O_5$). This had a ratio of 3 parts by weight of phosphate solids to one part by weight of silicate solids and about 35% solids in the homogeneous solution. The ratio of ($P_2O_5$+$SiO_2$) to $Na_2O$ was 1.3. 96% of this product floated for 24 hours on toluene and had a bulk density at 1.7% $H_2O$ of 3 lbs./ft.$^3$. This product showed no color reaction or effect on the setting time when used as a filler for unsaturated polyester resins.

Utility

As indicated earlier, my invention is particularly useful as a filler, and particularly as a filler for simulated wood. Wood used in furniture manufacturing has a density of about 30–45 lbs./ft.$^3$ and is strong and versatile. However, quality wood is becoming scarce and skilled craftsmen capable of carving furniture parts get very high wages. As a consequence the furniture industry is being forced into the use of synthetics. There are three basic competitors for this furniture market: polyurethane foam, injection molded polystyrene, and the unsaturated polyesters. The injection molded polystyrene requires a very large capital investment, but is good for mass production of many parts. Molded polyurethane foam is widely used in the industry but molded parts must be made with a very low density (25–28 lbs./ft.$^3$) to make them economical because of the high cost per pound of polyurethane. The low density makes the polyurethane foam unusable for many structural parts. Unsaturated polyester resins are very well suited for all furniture parts, but their high density (70–80 lbs./ft.$^3$) puts them at an economical disadvantage despite their low price. A low cost, low density, filler is therefore needed to reduce the cost per cubic foot of polyester resin and at the same time make the polyester parts have about the same density, feel, sound and appearance as wood. The light weight filler must not absorb the resin or react with the resin.

In this industry, the "true particle density" of the filler is important because it correlates with the poured density of the filled polymer. The true particle density should range between about 8 and 30 and preferably between 8 and 20 pounds per cubic foot. The maximum weight of filler at a given viscosity, usually about 1500 cp., is desired. Therefore one seeks the maximum volume for a given weight of filler and this is controlled by the true particle density and perfection of sphericity. If the spheres are perfect, that is round and without holes, the maximum filler content will be obtained and there will be no change in density on setting. This change usually ranges about 2 to 10 pounds per cubic foot and may be reduced if the spheres are coated with a small amount (1% for example) of silicone oil, e.g. dimethylpolysiloxane.

The crush strength is determined in a non-reactive liquid. My spheres are highly resilient, pliant particles which may be pressed together without breaking until the shells reinforce one another and develop a honeycomb-like structure. In this form, they resist much higher pressures than brittle glass spheres. In the initial stages the glass spheres appear stronger but, as an example, at 2400 p.s.i., the glass spheres have been crushed to a true particle density of 75 pounds per cubic foot whereas my product still has a true particle density of 45 pounds per cubic foot.

This invention is especially related to fillers for polyesters and especially unsaturated polyesters. In more general terms, I use my product as a filler for thermosetting polymers such as the unsaturated polyesters, the epoxies, phenolformaldehyde polyurethanes, silicones, and natural and synthetic elastomers and latices. It also may be used for compositions of thermoplastics which are later molded by raising the temperature and for plastics which set by evaporation or catalytically.

More specifically, my product is useful in the manufacture of cultured marble, insulation board, marine fabrication, construction, facing stone or brick and substitutes therefor. These outlets require a variety of particle sizes and densities. The compositions have excellent appearance, green strength and nailability.

In summary then, the advantages of the product of my invention, when used as an extender or filler are as follows:

(1) low cost;
(2) non-reactive with alkali-reactive polymers and additives;
(3) low oil absorption;
(4) free from holes large enough to absorb any significant amount of resin;
(5) spheres having a film strength sufficient to retain their shape and avoid breakage when incorporated in viscous resin formulations.

Possible modifications of the invention

When a patent eventually issues to one company, it sometimes happens that a competing company will take the position that the patent does not cover what the competing company is doing on the grounds that what the competing company is doing is not specifically spelled out in the patent. In such a situation the competing company will often try to argue that the slightly different procedure that the competing company is using was not even contemplated by the inventors. Although the courts will usually apply the "doctrine of equivalents" in such situations to protect the patent owner, the court itself is often in at least some doubt as what possible modifications the inventor did have in mind. Accordingly, it is believed that it would be worthwhile to set forth here some of the *possible* substitutions of materials and alternative procedural steps that I believe would readily suggest themselves to those skilled in this art.

First of all, I think that one skilled in the art might be inclined to try to substitute potassium silicate for the sodium silicate set forth in step (a). If a potassium silicate is used, the ratio of $SiO_2/K_2O$ can be within the range of 1.5:1 to 4.2:1.

Secondly, I think one skilled in the art might be inclined to try to combine steps (a), (b) and (c) above into a single step by introducing the silicate, pentaborate and water into a single reaction or mixing zone so as to end up with the same product that is set forth in step (d) above. Alternatively a less desirable product is formed by treating a spray-dried silicate of appropriate size and composition with the polysalt solution, thus tying up surface alkali by diffusion.

Thirdly, I do not consider that the following are polysalts: borax, boric acid, trisodium phosphate, ammonium phosphate, ammonium oxalate, ammonium carbonate, dibasic calcium phosphate, and ammonium chloride.

Fourthly, I think one skilled in the art might try to use a drying temperature that is outside of the range set forth in step (f), possibly in conjunction with somewhat different ratios or percentages than are set forth in steps (a)–(e), in order to find a suitable combination of parameters that would fall outside the scope of the claims. Such experimentation, even if successful, would obviously not depart from the basic concept of the invention.

Accordingly, it should be understood that I do not consider that any such departures from the very specific parameters set forth in the claims are in any way a departure from the inventive concept that I have disclosed, and I intend to rely upon the well-known doctrine of equivalents insofar as any such departures are concerned.

What I claim is:

1. Hollow spheres, the shells of which consist of:
   (a) an inorganic polysalt selected from the group consisting of borate salts of alkali metal and ammonium cations and phosphate salts of alkali metal and ammonium cations;
   (b) an alkali metal silicate selected from the group consisting of sodium silicate having an $SiO_2/Na_2O$ mol ratio of 1.5 to 4.0/1.0, and potassium silicate having an $SiO_2/K_2O$ mol ratio of 1.5 to 4.2/1.0; the ratio of polysalt solids to alkali metal silicate solids being between 0.02:1.0 and 3.0:1.0; and
   (c) up to 25% water on a weight basis; said spheres being filled essentially with air.

2. The hollow spheres of claim 1 characterized by an absence of ammonia in the air found within said hollow spheres.

3. The hollow spheres of claim 1 wherein the polysalt is selected from the group consisting of sodium pentaborate, ammonium pentaborate and sodium hexametaphosphate.

4. The spheres of claim 3 in which the polysalt is sodium hexametaphosphate and the ratio of the sodium hexametaphosphate solids to silicate solids is from 1.0:1.0 to 3.0:1.0.

5. The hollow spheres of claim 1 containing up to 20% water on a weight basis.

6. The hollow spheres of claim 1 containing up to 7% water on a weight basis.

7. The hollow spheres of claim 1 containing 0.5 to 4.0% water on a weight basis.

8. The hollow spheres of claim 1 having a bulk density of 2 to 20 lbs./ft.$^3$ and a particle size within the range of 10–400 mesh.

9. The spheres of claim 3 in which the polysalt is ammonium pentaborate and the ratio of the ammonium pentaborate solids to silicate solids is from 0.03:1 to 0.5:1.

10. The sphere of claim 3 in which the polysalt is sodium pentaborate and the ratio of sodium pentaborate solids to silicate solids is from 0.02:1 to 0.3:1.

11. The sphere of claim 1 which is pliant.

References Cited

UNITED STATES PATENTS

| | | | |
|---|---|---|---|
| 2,797,201 | 6/1957 | Veatch et al. | 260—2.5 |
| 3,699,050 | 10/1972 | Henderson | 252—317 |

FOREIGN PATENTS

| | | |
|---|---|---|
| 117,968 | 3/1958 | Russia. |

DELBERT E. GANTZ, Primary Examiner

S. L. BERGER, Assistant Examiner

U.S. Cl. X.R.

106—75; 117—100; 260—40 TN